Aug. 19, 1969  M. EDGAR  3,462,188
COMBINED WIND AND HAND GUARD FOR BICYCLES
Filed Sept. 5, 1967
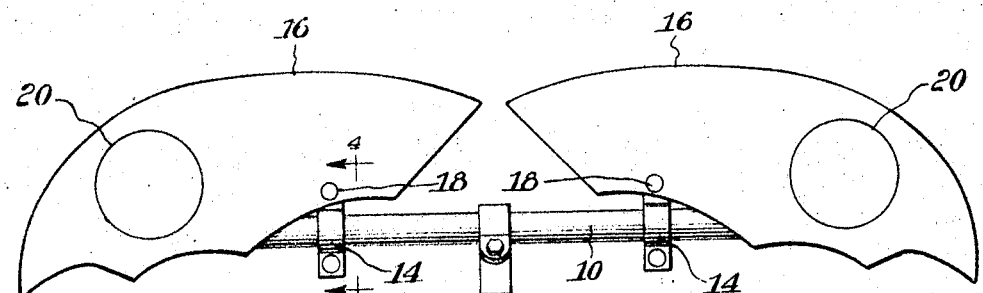
FIG. 1
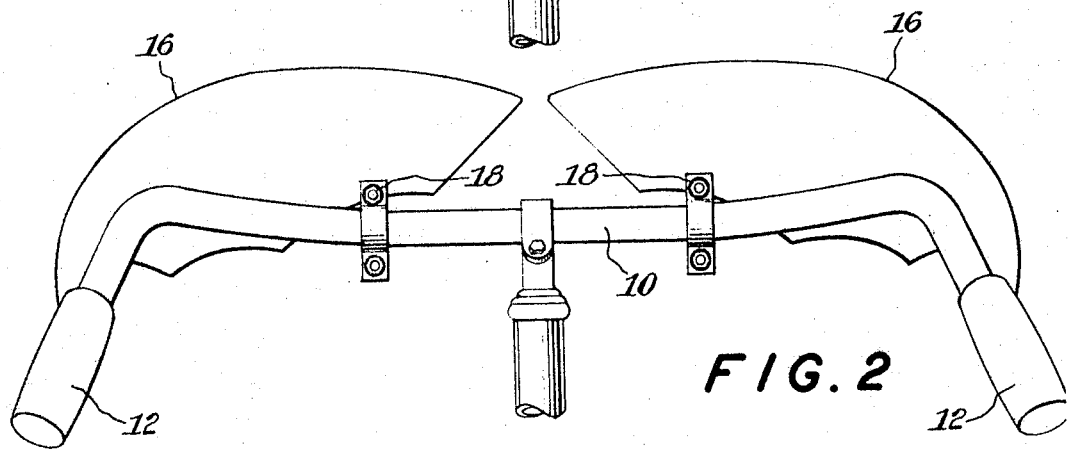
FIG. 2
FIG. 3
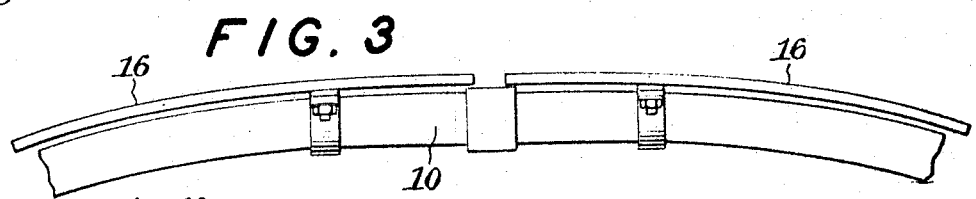
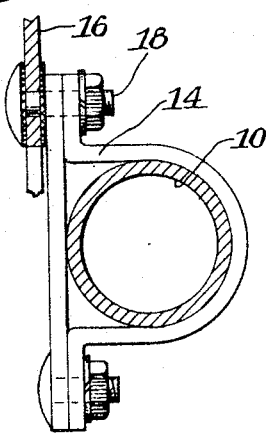
FIG. 4
INVENTOR.
MANUEL EDGAR United States Patent Office 3,462,188
Patented Aug. 19, 1969

3,462,188
COMBINED WIND AND HAND GUARD
FOR BICYCLES
Manuel Edgar, Denver, Colo. (SFC RA 55194809,
U.S.A. S&MA, LSD, APO, N.Y. 09052)
Filed Sept. 5, 1967, Ser. No. 665,509
Int. Cl. B62j 23/00, 17/00
U.S. Cl. 296—78.1                    4 Claims

ABSTRACT OF THE DISCLOSURE

A device adapted to be secured to the handle bars of a bicycle or tricycle to protect the rider from the wind and also protect his hands. This device also has a special appearance which encourages young riders to use same and enables him to participate in various games with other riders.

Summary of the invention

I provide first and second wind and hand guards, each having the shape of a bat wing. Separate clamps detachably secure each wing to a corresponding portion of a handle bar having hand grips at each end adjacent the corresponding hand grip whereby the wings extend end to end horizontally.

The bar is connected in conventional manner to a bicycle or tricycle. The rider is at least partially screened from the wind and his hands are protected in case of collisions and the like. The bat wing design enables groups of riders to play various games and for example take the role of "Batman," thus motivating them to make use of the wind protection and safety features of the invention.

Brief description of the drawings

In the drawings:
FIG. 1 is a front view of my invention;
FIG. 2 is a rear view thereof;
FIG. 3 is a top view thereof; and
FIG. 4 is a view through 4—4 in FIG. 1.

Detailed description of preferred embodiment

Referring now to FIGS. 1–4, there is shown a conventional handle bar 10 having hand grips 12 at each end. First and second detachable clamps 14 encircle the bar at separate positions on opposite sides of the center. A separate wind and hand guard 16 in the shape of a bat wing is secured by bolt 18 to one end of the corresponding clamp whereby the guards 16 lie in almost vertical planes in front of the bar and extend horizontally, being disposed end to end with a small separation and extending somewhat around and adjacent the corresponding grip.

Each guard carries a separate circular emblem 20 secured to the front surface and carrying a suitable design (not shown).

Having thus described my invention, I claim as new and desire to secure by Letters Patent:

1. In combination with a bicycle having a handle bar having hand grips at each end, first and second wind and hand guards, each guard being detachably secured to the bar adjacent and in front of the bar and corresponding hand grip whereby the guards extend end to end horizontally, each guard having the shape of a bat wing.

2. The combination as set forth in claim 1 further including first and second clamps, each clamp being secured to a corresponding wing, each clamp encircling the bar.

3. The combination as set forth in claim 2 further including first and second circular emblems, each emblem being secured to the front surface of the corresponding wing.

4. The combination as set forth in claim 3 wherein each emblem carries a suitable design.

References Cited

UNITED STATES PATENTS 567,860    9/1896    Monaghan _____ 296—78.1

FOREIGN PATENTS 411,839    4/1910    France.
515,768    2/1955    Italy.
120,680    11/1926   Switzerland.

KENNETH H. BETTS, Primary Examiner

U.S. Cl. X.R.
74—551.8; D90—11